United States Patent
Sonawane et al.

(10) Patent No.: US 12,511,908 B2
(45) Date of Patent: Dec. 30, 2025

(54) VIDEO ANALYTIC WORKER SAFETY MONITORING SYSTEM FOR WORKPLACE HAZARDS

(71) Applicant: EATON INTELLIGENT POWER LIMITED, Dublin (IE)

(72) Inventors: Navnath Nivrutti Sonawane, Nashik (IN); Aniket Nandlal Patil, Maharashtra (IN); Sangram Dadasaheb Pawar, Maharashtra (IN)

(73) Assignee: Eaton Intelligent Power Limited, Dublin (IE)

( * ) Notice: Subject to any disclaimer, the term of this patent is extended or adjusted under 35 U.S.C. 154(b) by 462 days.

(21) Appl. No.: 17/826,629

(22) Filed: May 27, 2022

(65) Prior Publication Data

US 2023/0410526 A1    Dec. 21, 2023

(51) Int. Cl.
G06V 20/56 (2022.01)
G06T 7/00 (2017.01)
G06V 40/10 (2022.01)
G06V 40/16 (2022.01)

(52) U.S. Cl.
CPC ............ *G06V 20/56* (2022.01); *G06T 7/0008* (2013.01); *G06V 40/103* (2022.01); *G06V 40/166* (2022.01); *G06T 2207/30201* (2013.01)

(58) Field of Classification Search
CPC ........ G06T 2207/30201; G06T 7/0008; G06V 20/52; G06V 20/56; G06V 40/103; G06V 40/166; F16P 3/142; F16P 3/144; G05B 19/406
See application file for complete search history.

(56) References Cited

U.S. PATENT DOCUMENTS

| | | | |
|---|---|---|---|
| 10,325,485 B1* | 6/2019 | Schuster | G01S 17/88 |
| 2009/0040014 A1* | 2/2009 | Knopf | E04G 21/32 |
| | | | 340/5.1 |
| 2010/0328443 A1* | 12/2010 | Lynam | G08B 21/245 |
| | | | 348/E7.085 |
| 2012/0146789 A1* | 6/2012 | De Luca | G08B 21/24 |
| | | | 382/103 |
| 2014/0307076 A1 | 10/2014 | Deutsch | |
| 2017/0300758 A1* | 10/2017 | Renkis | G08B 13/19656 |
| 2019/0318170 A1* | 10/2019 | Rokade | H04N 7/181 |
| 2019/0340909 A1 | 11/2019 | Nguyen | |
| 2021/0390812 A1* | 12/2021 | Chaurasia | G07C 9/20 |

FOREIGN PATENT DOCUMENTS

WO    WO 2021224728 A1    11/2021

OTHER PUBLICATIONS

EESR received for EP Application No. EP23172640.7, 6 pages, Sep. 26, 2023.

* cited by examiner

*Primary Examiner* — Michael J Vanchy, Jr.
(74) *Attorney, Agent, or Firm* — Baker Botts L.L.P.

(57) ABSTRACT

A video analytic worker safety monitoring system includes at least one video camera having a field of view including a defined safety zone in a workplace, the defined safety zone including or being proximate to a workplace hazard such as an electrical hazard, a machine hazard, or a medical procedure hazard. An image processor receives a video feed from the at least one camera, wherein the image processor is configured to, based on image analysis of the received video feed, detect worker safety deficiency events.

20 Claims, 6 Drawing Sheets

VIDEO ANALYTIC WORKER SAFETY MONITORING SYSTEM FOR WORKPLACE HAZARDS

BACKGROUND OF THE INVENTION

The field of the invention relates generally to worker safety monitoring systems, and more specifically to computer-implemented video analytic sensor and detection systems monitoring worker access to hazardous locations and the appropriate use of personal protective equipment by workers performing tasks in hazardous locations of the workplace.

It is sometimes necessary in a variety of industries for workers to enter potentially hazardous environments to perform required tasks. To protect the human body from such hazards, various types of personal protective equipment (PPE) have been developed to reduce a likelihood of worker injury on the job, or to reduce exposure to hazardous substances that could pose a risk of illness or disease and therefore raise health-related concerns. Regulations are now widespread that require certain employees to be trained in the proper use of appropriate PPE items while performing tasks in and around hazardous locations of the workplace.

Monitoring systems exist that assist workers in safely completing tasks and assist employers in overseeing safety concerns for hazardous environments. Known monitoring systems are, however, disadvantaged in some aspects, and improvements are accordingly desired.

BRIEF DESCRIPTION OF THE DRAWINGS

Non-limiting and non-exhaustive embodiments are described with reference to the following Figures, wherein like reference numerals refer to like parts throughout the various drawings unless otherwise specified.

DETAILED DESCRIPTION OF THE INVENTION

Figure 1:
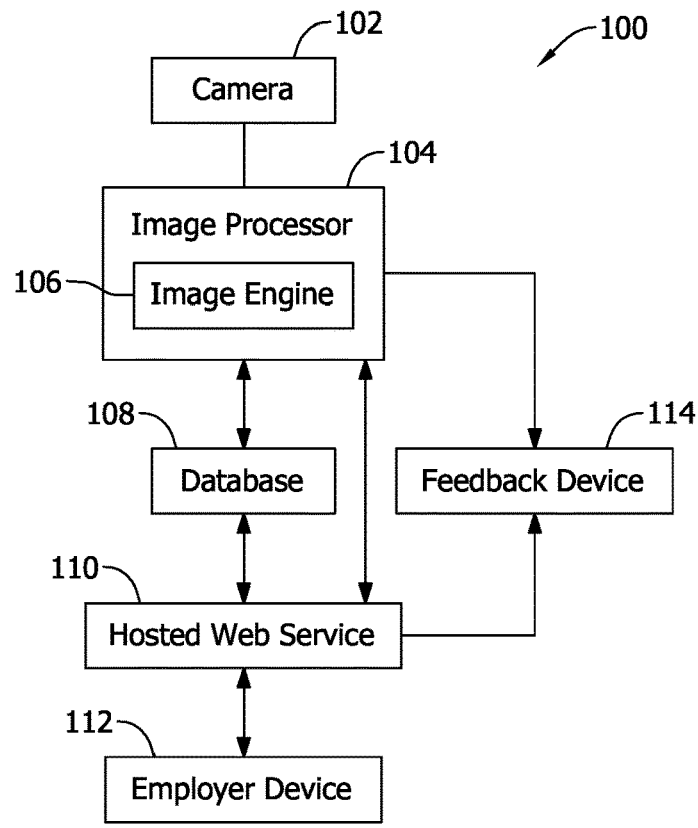
FIG. 1 schematically illustrates an exemplary computer-implemented video analytic worker safety monitoring system according to an exemplary embodiment of the present invention.

In order to appreciate the invention to its fullest extent, a discussion of state of the art worker safety devices and systems and longstanding but unfulfilled needs to improve worker safety in hazardous environments of industrial settings and workplaces, followed by exemplary embodiments of inventive computer-implemented video analytic worker safety monitoring systems and computer-implemented videos analytic worker safety methods that beneficially overcome the shortcomings of the state of the art.

Low cost and simply installed warning devices are available and in use to visually alert workers that they are about to enter a hazardous area or location in the workplace that presents a risk of harm or adverse health effect to workers. For example, signage, warning lights, and red safety tape may be utilized to visually warn workers of safety or health risks presented in certain areas of the workplace before workers enter hazardous areas. In theory, workers who are not sufficiently trained and authorized to enter such hazardous locations will not enter them, and workers who are fully trained and authorized for entry will enter hazardous areas only with appropriate personal protective equipment (PPE) items to mitigate any risk of harm or adverse health effects. Worker confusion and mistake is possible, however, both with respect to access to hazardous locations and in the proper use of PPE items. Without more, entry by unauthorized and/or unprotected workers to hazardous locations despite the warning devices presented is difficult for supervisors to reliably detect and address in order to more effectively ensure worker safety.

Physical barrier devices and barrier systems are likewise known that must be operated by workers in order enter hazardous locations in the workplace. Such physical barrier devices are typically operable, for example, in a closed position obstructing worker access and in an opened position allowing worker access to a hazardous location. Such physical barrier devices are normally in the closed position to safely obstruct worker access to a hazard, and without successful operation of the physical barrier device or system to the opened position workers are generally impeded, if not entirely prevented, from physically accessing and entering locations where hazards exist.

For example, physical barrier devices in the form of retractable barrier gates may be provided in the workplace that require intentional acts of a worker to open the barrier gate in order to access the hazardous location. Locks and keys may be likewise provided with barrier devices to further restrict hazardous location access only to selected, authorized workers having a key. Such physical barrier devices and systems, unlike the warning devices described above, more effectively prevent workers from physically accessing hazardous locations than warning devices discussed above that do not physically obstruct worker access to hazards. This is particularly so for inattentive or distracted workers that may not see or observe, let alone obey, any warning devices that may also be present.

Worker confusion and mistake with respect to physical barrier devices is still possible, however, to compromise if not defeat the desired worker protection. For instance, if a physically barrier device (e.g., a gate or a door) is opened and inadvertently left opened, it will not obstruct access to an approaching worker who may not appreciate that the barrier device is supposed to be closed for safety reasons, or further still to a worker who may fail to appreciate the safety hazard or health hazard presented by continuing through the opened barrier device. Such instances are difficult by employers or supervisors to detect unless they are present to witness it, and in many cases they are not. Similar problems are presented by physical barrier devices when, unbeknownst to workers, they fail to completely close or malfunction in a manner that causes the barrier devices to open. As such, physical barrier devices can still be unreliable and ineffective to fully protect workers.

Computer-implemented monitoring systems are known that may detect worker location and/or PPE items in possession of workers while in hazardous locations. Such computer-implemented monitoring systems typically include identification devices carried by or worn by the workers being monitored, with each identification device wirelessly communicating data signals to processing devices to uniquely identify workers and PPE items associated with each worker based on the data signals. For example, in monitoring systems of this type, identification elements may wirelessly communicate data and information with base station elements of the monitoring system via Bluetooth communication protocols, or radio frequency identification (RFID) tags may communicate with reader elements of the monitoring system as workers move about hazardous locations in the workplace. Detection of unauthorized workers in hazardous locations and/or insufficiently protected workers is therefore possible via such computer-implemented monitoring systems, with alert capability and reporting ability to workers and supervisors for much more effective oversight of worker safety concerns than warning devices and physical barrier devices/systems alone can provide.

The wireless data signal communication of the identification elements in known computer-implemented safety monitoring systems renders them disadvantageous in some aspects. For example, wireless data signal communication of the identification elements is sometimes subject to signal interference in use that impairs reliable operation of the system to detect worker locations and PPE items. Such signal interference may be electromagnetic in nature as well as physical in nature via temporary blockage of a signal path as workers move about the workplace and move relative to one another. Such signal interference temporarily disrupts real-time detection of workers and PPE items needed to keep them safe or healthy, and as a result at least some of the time some undesirable ambiguity is presented to the monitoring system regarding worker proximity to hazards and whether PPE items are actually present to provide the desired worker safety. Such wireless data signal monitoring systems can also be quite expensive, as identification elements capable of wireless communication is required for each worker and for each PPE item that is desirably monitored. Over a number of workers and a number of PPE items for each worker, costs to provide the required number of identification elements to communicate the needed data signals for detection can be substantial and sometimes cost prohibitive.

Additionally, monitoring systems of the type described above require a number of base stations, reader devices, and gateway devices distributed throughout monitored locations to communicate with the worker and PPE item identification elements and to collect and forward data to a processing device that makes the required detections of workers and PPE items based on the data received. The setup and operation of such wireless data transmission monitoring systems for larger workforces and larger workspaces therefore requires significant cost and complexity to manage, rendering them sub-optimal to some employers. Additionally, required maintenance and troubleshooting for such monitoring systems, particularly with respect to battery powered identification elements needed to make the wireless communications, can be significant and undesirable to some employers.

Still further, wireless communication monitoring systems of the type described above are of course dependent on each worker having an active wireless identification element and each PPE item having an active wireless identification element to transmit or otherwise wirelessly communicate identification data to another device in the monitoring system. Workers or PPE items that lack such an active wireless identification element would be invisible to the monitoring system. Of course, this means that an affected worker may believe that the monitoring system is operating for protective purposes when it is not. This is particularly unfortunate in the case of a malfunctioning or non-functional and therefore inactive identification element.

In view of the above, long felt but unfilled need exists in the marketplace for lower cost and more reliable computer-implemented worker safety detection systems and methods to detect worker proximity to identified workplace hazards, provide warning and feedback notification to assist workers who may not be in an authorized location, to provide warning and feedback notification to workers who may not be adequately protected with applicable PPE items, and to provide supervisor intelligence, alerting and reporting for employers and supervisors to monitor worker safety concerns with enhanced effectiveness relative to existing worker safety systems.

Exemplary embodiments of computer-implemented, video analytic sensor systems are described hereinbelow that advantageously operate to monitor worker safety concerns without requiring wireless communication of signals via active identification elements that can be undesirably subject to performance limitations, including but not limited to interference issues as discussed above. Worker safety detection is instead realized in the video analytic sensor systems with relatively low cost video cameras that in some instances may already be on-site and operating in many workplaces. Video feeds from the videos cameras may be received by an image processing device, and based upon image analysis from the video feeds, the image processing device may detect, identify, track, and monitor individual workers and groups of workers moving about workplace hazards without the workers individually needing active identification elements for identification purposes via wireless signals. Likewise, the video cameras and image processing device may effectively allow PPE items to be detected without individually requiring the PPE items to individually have active identification elements for wireless communication signaling. Base stations, reader devices, and gateway devices of known wireless data transmission monitoring systems are likewise not required by the video analytic sensor system.

In beneficial aspects, video analytic sensor systems of the invention may be implemented with relatively low cost, closed circuit television (CCTV) cameras that may reliably detect and track worker proximity to identified workplace hazards, worker movement in and through identified virtual safety zones, and a presence of required personal protective equipment (PPE) items for workers approaching safety zones and for workers within each safety zone. Image-based detection techniques, based on video feeds and frames captured by the video cameras, may be utilized in the safety system of the invention to identify authorized or unauthorized workers and/or adequate use of PPE items in the virtual safety zones by workers, as informed by computer-implemented processing of images, detected items or objects in the images, and comparison of detected items or objects to worker identification object data and PPE item object data stored in a database accessible to the image-processing computer device.

The video analytic sensor system is operable with machine vision in a manner that is much less susceptible to electromagnetic signal interference in the operation of the system, and in the case wherein multiple video cameras are present, the video analytic sensor system is less prone to unreliable detection of workers and/or unreliable PPE item detection. By virtue of the machine vision, image-based processing that does not rely on active identification elements to make wireless data communications, workers and PPE items cannot disappear or be rendered invisible to the video analytic sensor system. Via the video analytic sensor system, worker safety can be monitored individually and in groups in a much more cost effective manner with simpler set up and less maintenance than existing computer-implemented systems.

FIG. 1 schematically illustrates an exemplary video analytic worker safety monitoring system 100 according to an exemplary embodiment of the present invention. The video analytic worker safety monitoring system 100 includes, as shown, at least one video camera 102 in communication with an image processor computer device 104 that is configured with an image engine 106 to analyze images from the video feed output from the video camera 102. The image engine 106 may be implemented in algorithmic form in computer code to accomplish the objectives described below in detecting worker proximity to hazards in the workplace, determine authorization of workers to enter hazardous locations, and to detect PPE items needed to keep the workers safe and/or healthy while passing through or while performing tasks in hazardous workplace locations such as those described below with reliable machine vision to monitor worker safety concerns.

The image engine 106 may operate in reference to data and information in a database 108 to analyze images, target and identify objects in the images, and to make the desired determinations and take desired actions described below. Machine vision detection of worker safety events and supporting data, including image data and screenshots of detected events may likewise be stored in the database 108 as the system operates. The image processor 104 may be locally or remotely located from the camera 102 in the monitored workplace. The database 108 may further be locally or remotely located from the image processor device 104.

The database 108 and/or image processor 104 is accessible via, for example, a hosted web service 110, with an employer computing device 112 connected to the Internet in a known manner. Worker supervisors or employers may access and retrieve information in the database 108 via the employer computing device 112, or reports, alerts and/or notifications may be sent automatically to employer devices 112 through the hosted web service. The employer computing device 112 in contemplated examples may be a desktop computer, a laptop or notebook computer device, or a portable computing device such as a tablet computer device or a smartphone as non-limiting examples.

A feedback device 114 is also operatively connected to the image processor 104 or to the hosted web service 110 to provide worker alert or worker notification capability. The feedback device 114 may in various different contemplated embodiments be an audio indicator element (e.g., a speaker device providing an audio alert or audio message feedback signal to a worker), a visual element (e.g., a light element or display) providing a visual feedback signal (e.g. red, green or yellow light or flashing lights versus steady lights as cues to workers of detected issues), or a haptic feedback element providing a tactile feedback signal to a worker or workers proximate a hazardous location in the workplace. Such haptic feedback elements may in some embodiments be provided on one or more wearable items of a worker, including but not limited to an identification lanyard, an identification badge, or a PPE item as non-limiting examples. By virtue of the feedback element 114, workers may take corrective steps to avoid exposure to a workplace hazard or to adequately protect themselves via proper PPE item usage. Worker feedback notifications may likewise be provided to worker devices such as smartphones or other portable computing devices in still other embodiments.

The system 100 as shown is scalable and may include any number of video cameras 102, image processors 104, databases 108, employer computing devices 112 and feedback devices 114 in order to monitor worker safety in relation to any number of hazards of the same or different type in different locations of the workplace.

While an exemplary architecture of the video analytic worker safety monitoring system 100 is shown and described, variations are of course possible and may be implemented in further embodiments with otherwise similar functionality. In some implementations, the system 100 may be implemented in a computer server-based architecture, although server-based architectures are not necessarily required for the benefits of the invention to be obtained. In some embodiments, the hosted web service 110 may be optional and other forms of network access (e.g., local area networks and other known alternatives) may be established to perform and communicate image analysis and detected worker safety events with the employer device 112.

Figure 2:
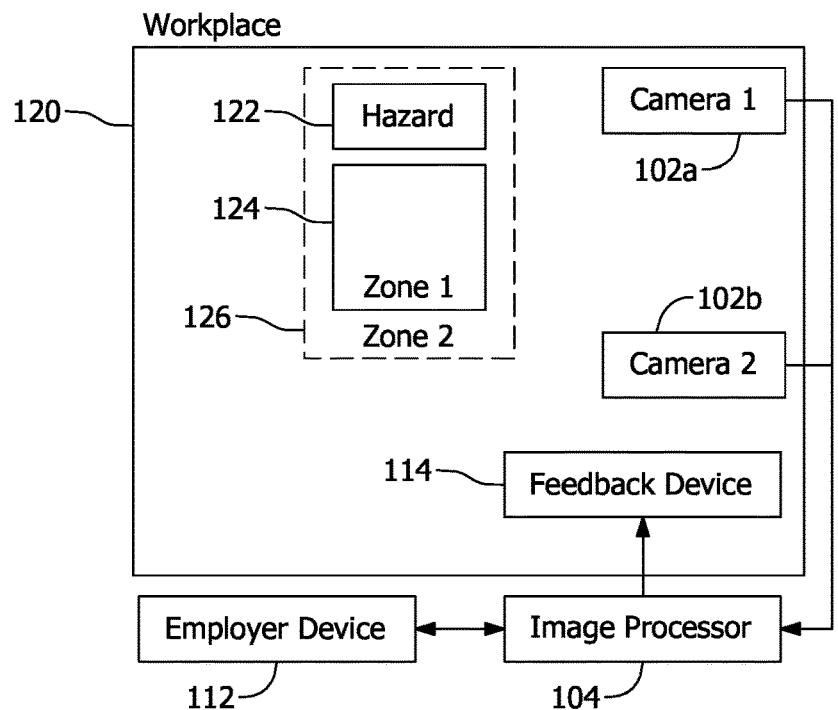
FIG. 2 schematically illustrates the video analytic worker safety monitoring system shown in FIG. 1 installed in a hazardous workplace location.

FIG. 2 schematically illustrates aspects of the video analytic worker safety monitoring system 100 installed in a hazardous workplace location 120 which in contemplated embodiments corresponds to an interior location defined by a number of walls. A hazard 122 is located in the workplace location 120, and the health and safety risks posed by the hazard 122 vary to workers varies with the nature of the hazard 122 and with worker proximity to the hazard 122. Accordingly, and in the example shown, first and second safety zones 124, 126 are defined proximate the hazard 122. In the example shown, the first safety zone 124 is more proximate (i.e., closer to) the hazard 122 and presents a greater health or safety risk to a worker than does the second safety zone 126 that is not as proximate (i.e., farther from) the hazard 122. As such, a worker present in the first safety zone 124 may require PPE items for adequate protection are not necessarily needed in the second safety zone 126, while workers outside of the first and second zones 124 and 126 may not require PPE items at all as they would be sufficiently distanced from the hazard 122 and associated health or safety risks.

The safety zones 124, 126 may in some embodiments be determined by the video analytic sensor system 100 and established as virtual boundaries for purposes of image processing of the video feed from the video cameras 102a and 102b. In other embodiments, the establishment of the virtual boundaries defining the safety zones 124, 126 may be input to the system 100 as part of the set up of the system. In still other embodiments, the virtual boundaries may be established from stored information in the database 108 (FIG. 1) based on detection of the hazard 122 via the video feed from one of the video cameras 102a, 102b. For example, the video camera 102a or 102b may in its field of view include an image of a label, a bar code, or other machine readable or object image recognizable by the image processor 104 that may indicate to the image processor 104 the particular type of hazard present, and in turn allowing the image processor 104 to retrieve the applicable safety zone or safety zones needed to protect workers proximate the detected hazard from the database to deploy as virtual boundaries in the image feed from the cameras 102a, 102b.

Using the virtual boundaries in machine vision via the video cameras 102a, 102b, workers may be detected by the system 100 as being inside or outside of the safety zones 124, 126 or moving toward or away from the safety zones 124, 126. The size and number of the safety zones 124, 126 and corresponding virtual boundaries for image analysis processing may be determined in a known manner dependent on the nature of the hazard 122 and its possible health or safety affects on workers that are proximate the hazard 122 in one of the safety zones 124, 126. While the safety zones 124, 126 are shown as rectangles in FIG. 2, other geometric shapes of the safety zones and virtual boundaries are possible such as a circular boundaries in other examples. Also, in the example shown, two video cameras 102a and 102b are provided with different fields of view that each encompass the safety zones 124, 126 and associated virtual boundaries for image processing purposes. Different fields of view obtained via multiple video cameras 102a, 102b beneficially provide different opportunities to identify workers and PPE items from different vantage points in the machine vision provided, such that one of the fields of view may allow detection of a worker or PPE item that the other may not depending on the number of workers present and the position of workers relative to one another and relative to the video cameras 102a, 102b.

One or both of the video cameras 102a, 102b may be relatively low cost, closed circuit television (CCTV) cameras, and one or both of the CCTV cameras 102a, 102b may already exist at the site of the workplace 120 for general surveillance purposes or for other purposes other than the worker safety monitoring for the hazard 122 performed by the system 100. In the case of an existing CCTV camera 102a, 102b the cost of installing the system 100 would be reduced since the CCTV cameras 102a or 102b are already present with a field of view to sufficiently apply the virtual boundaries for image-based worker proximity detection relative to the hazard 122.

If new CCTV cameras are needed for the system 100, however, suitable cameras can be obtained in a low cost range of about $40 to about $100 and still would realize significant cost savings relative to conventional monitoring systems operative with respect to wireless data transmission signals as discussed above. For example, active identification elements with wireless communication functionality may be obtained in a cost range of about $40 to about $140 apiece, and per the discussion above large numbers of such active identification elements would be needed to detect and distinguish a group of workers and respective groups of PPE items needed for each worker. Considering a safety zone wherein each worker present requires five PPE items for adequate protection, six active element identification elements (one for the work and one for each of the five respective PPE items) are required to monitor each worker, so the cost range of just the active identification is about $240 to about $840 per worker. Such cost per worker is further multiplied across the number of workers that are authorized to be in the safety zone. In a ten worker scenario then, the cost range of the active identification elements for ten workers would be about $2400 to $8400 per safety zone to be monitored.

The CCTV cameras 102a, 102b, in contrast, can be obtained in a cost range of about $40 to about $100 apiece, so the per safety zone cost of the cameras would be $80 to $200. The CCTV cameras 102a, 102b can easily operate with respect to groups of workers and groups of PPE items using the image processing of the image processor 104. As such, the CCTV cameras 102a, 102b may be sufficient to detect all ten workers and five PPE items for all ten workers. The CCTV cameras 102a, 102b may therefore be strategically located in the workplace, or added in strategic locations to effectively monitor worker safety at significantly lower cost than known systems operating on wireless data signal paths via active identification elements.

While CCTV cameras 102a, 102b may be particularly advantageous for the reasons above in the system 100, video cameras other than CCTV cameras may likewise provide video feeds that can be efficiently and effectively analyzed by the image processor 104 with similar benefits. Also, while a dual camera embodiment with first and second video cameras is shown in FIG. 2, a single video camera may suffice in another embodiment in certain applications to monitor worker safety. Likewise, three or more video cameras may be provided depending on the workplaces being monitored and in view of particular hazards that would benefit from more than two fields of view in order to assess worker safety with reliable machine vision. As noted above, the system 100 is scalable to include any number of cameras with respect to any particular hazard 122 or for different hazards 122 distributed about the workplace 120.

It is recognized that the workplace may include multiple spaces or rooms having different hazards 122 in the same space or rooms or in different spaces or rooms. One or more video cameras may therefore be provided in each space with fields of view including defined safety zones and virtual boundaries for workers navigating through the different spaces. More than one image processor 104 and database 108 may likewise be provided as needed to accommodate simultaneous monitoring of many hazardous locations present in the workspace. While the system 100 is described thus far in the context of an interior workspace, the system 100 is equally applicable to outdoor spaces via strategic location of video cameras to provide the needed video feeds to be analyzed by the image processor 104.

Figure 3:
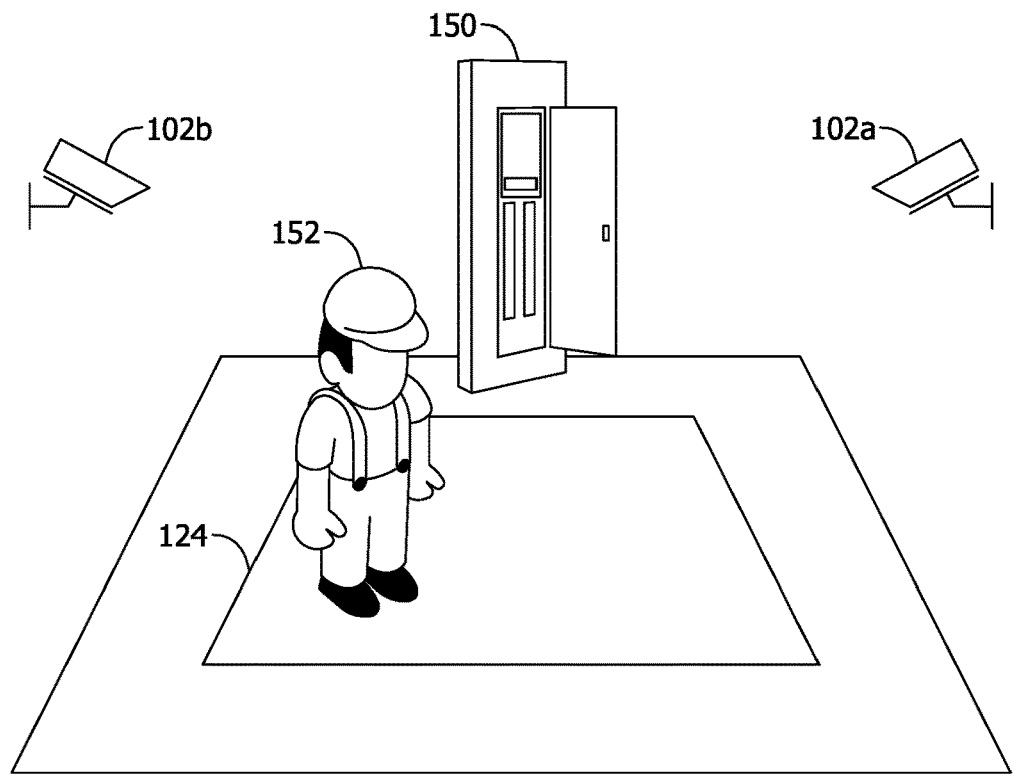
FIG. 3 illustrates the video analytic worker safety monitoring system as applied to a first exemplary workplace hazard.

FIG. 3 illustrates the video analytic worker safety monitoring system 100 in operation to monitor worker safety in relation to a first exemplary workplace hazard in the form of an electrical panel 150. Workers in the electrical industry, and more specifically those working in and around electrical power systems including such electrical panels 150, must be trained in the appropriate use of personal protective equipment to mitigate possible electrical hazards with which they may face while working on the electrical panel 150.

Aside from hazards associated with electrical shock and electrocution when human flesh is brought into contact with energized conductive components when serving the electrical panel 150, electrical arc flash incidents are of particular concern. Electrical arcing, or current flow between two or more separated energized conductors, may be experienced when installing, servicing, and maintaining electrical systems via electrical panels 150 defining respective connection points in the electrical power system. Arcing may occur from electrical fault conditions and can release significant amounts of concentrated radiant energy at the point of arcing in a fraction of a second, resulting in high temperatures that may burn persons exposed to them. Additionally, arcing conditions may produce pressure blasts that are more than sufficient to knock nearby workers off their feet, and shrapnel may be generated by the blast.

Aside from electrical fault conditions, arcing may result from human error including dropping of tools onto energized conductors, accidental contact with electrical component, improper work procedures, and insulation failure of components used in the electrical systems, including but not limited to cables that interconnect electrical components and equipment in the electrical panel 150. A build-up of dust, impurities and corrosion on insulating surfaces may also contribute to arcing conditions. Sparks generated during operation of circuit breakers, during replacement of fuses, and closing electrical connections on faulted lines may also produce an arc. Damage to components and equipment from rodents and pest infestations may result in arcing conditions. Considering the number of potential causes of electrical arcing, instances of electrical arcing are not predictable.

Accordingly, PPE items that are adequate or sufficient to provide at least a minimum level of protection to persons against potential electrical hazard has been developed for practically the entire human body, such as for example, shock, arc flash and arc blast. For example, persons wearing such personal protective equipment may be reasonably protected from potentially hazardous arc flash incidents and may avoid or reduce the likelihood of serious injury if such an arc flash incident occurs. Examples of PPE items and equipment may include a hard hat, a face shield, a flame resistant neck protector, ear protectors, a Nomex™ suit, insulated rubber gloves with leather protectors, and insulated leather footwear. Insulated tools may also be provided to complete certain tasks. Such PPE items and equipment may be fabricated from various materials to provide, among other things, thermal insulation protection to prevent severe burns to human flesh during high temperature arcing conditions, and to mitigate pressure blasts and shrapnel to avoid life-threatening wounds to a worker's head and torso if arcing conditions were to occur.

The amount, type and quality of personal protective equipment necessary for a particular task in an electrical power system will vary according to the potential arc hazard of the worker for different tasks in each particular electrical panel 150. For example, in the case of electrical fuses that need replacement under energized circuit conditions, fuses of higher electrical ratings may pose a greater risk than fuses of lower electrical ratings, and different amounts or types of PPE items and equipment may be required for replacing one fuse, for example, than for replacing another fuse.

The selection of the required thermal rating of PPE items and equipment depends on the incident energy level at the point of work. Flash energy analysis is typically required as a threshold inquiry to determine the arc flash boundary and incident energy level, and a thermal level of the personal protective equipment is matched accordingly with the calculated flash energy. Formulas for conducting the arc flash analysis are known and published for example, in the Institute of Electronic and Electrical Engineers (IEEE) Std. 1584 and the National Fire Protection Association (NFPA) 70E. To properly estimate arc flash exposure hazards, the maximum bolted short-circuit current, the arcing fault current, an operating time of an arc fault interrupting element associated with the point of interest, and a distance from an expected arc to the worker must be determined. In general, incident energy increases as the arc time and fault current increases. Software is available for analyzing arc flash exposure that may be used to determine suitable thermal ratings for particular tasks.

For the purposes of the system 100, the arc flash exposure may inform the size and shape of the safety zone 124 in which a worker 152 should be protected with applicable PPE items, and virtual boundaries can be established for image processing purposes to detect a worker's presence in the safety zone 124. As mentioned above, in some cases the system 100 can make the calculations needed to establish the safety zone and virtual boundary. In another case, the system 100 can look up the applicable safety zone via detection of the electrical panel 150 and a visual indicator (e.g., a label) including an electrical panel rating or other pertinent parameters (e.g., the type of cabling that may be identifiable by the system) for the electrical panel 150 that may be used to retrieve safety zone data stored in the database 108. In still another case, the calculations can be made outside of the system 100 and safety zone data can be manually input to the system 100 in the initial system setup.

Video feeds from the cameras 102a, 102b is output to the image processor 104, and the images may be analyzed with image processing algorithms to detect one or more objects to detect and optionally detect a worker that is approaching or is within the safety zone 124 in reference to the virtual boundaries in the image processing. For example, in contemplated embodiments the images from the cameras 102a, 102b can be analyzed to detect the presence of a human worker, as well as a worker lanyard or an identification badge or other worker identification element issued by the employer for worker identification purposes. Beneficially, the lanyard, identification badge or other worker identification element can be a passive device (i.e. a device without active wireless data signal capability), but to the extent that the worker identification element may be an active device for other purposes in the workplace the system 100 is not dependent on operation of the active device in order to operate.

In some cases the system 100 may optionally employ facial recognition techniques to uniquely identify a worker from the image processing performed, and as such the system 100 would not be operationally dependent on a worker identification element issued by the employer at all for worker identification purposes.

Image-based worker detection may be made as the worker approaches a safety zone boundary and the corresponding virtual boundary, as the worker crosses the safety zone boundary and the corresponding virtual boundary, and as the worker is within the safety zone boundary and the corresponding virtual boundary. As such, the system 100 can determine whether the worker is inside or outside of the virtual boundary whether the worker is moving or still, and therefore knows the actual worker proximity to the electrical panel 150 and the worker's relative position to the safety zone(s) needed to protect workers from potential hazards of the electrical panel 150.

In the operation of the system, worker identification objects can be targeted and detected from the images received and identified in comparative reference to worker identification data and information in the database 108. Targeted objects in the images (e.g., worker identification element issued by the employer for worker identification purposes or the worker's face) can be detected and compared to worker identification object data and information based on, for example, one or more of object shape, object size, object color, or object texture using applicable image processing algorithms analyzing the images received. If the object targets of interest are not detected or are not identified in the images of the worker, the system 100 can presume that the worker is not authorized to be in the safety zone 124. One or more feedback devices 114 (FIG. 1) located in the vicinity of the worker can then be activated to notify the affected worker that the worker's presence is not authorized in the safety zone 124. In response to the activation of the feedback device or feedback devices 114 the notified worker should then immediately leave the safety zone 124 in order to avoid exposure to the potential hazard(s) posed by the energized electrical panel 150.

For the benefit of the worker, the safety zones may optionally be marked for visual observation by the worker in order for the worker to know where the boundaries of the safety zone are in order to exit the safety zone. Directional signal lights, displays, or messages can also be produced by the feedback device or feedback devices 114 to provide direction to the worker where to move to assume a safer position. The feedback device or feedback devices 114 may continue to operate until the affected worker moves out of the safety zone, and once the safety zone is avoided, the feedback device or feedback devices 114 may be deactivated.

If the worker identification object target (or targets) are confirmed in the analyzed images as corresponding to authorized workers, the system 100 may proceed to analyze the images to determine whether the worker is wearing one or more of the applicable PPE items corresponding to the potential hazard(s) posed by the energized electrical panel 150. PPE item object targets can be detected from the images and identified in comparative PPE item identification data and information in the database 108. The object targets can be detected and compared to PPE item identification data and information based on one or more of object shape, object size, object color, or object texture using applicable image processing algorithms, which may be machine learning algorithms. If the PPE item objects targets of interest are not detected on the worker 152, the system 100 can activate one or more feedback devices 114 to notify the affected worker that the PPE items needed to safely occupy the safety zone 124 are not present. The notified worker should then immediately leave the safety zone 124 to avoid exposure to the potential hazard(s) posed by the energized electrical panel 150 while the worker is unprotected, and as needed to obtain the needed PPE items and return to the safety zone 124 to complete a required task on the electrical panel 150.

While one worker 152 is shown in FIG. 3, the system 100 is equally capable of simultaneously detecting and analyzing more than one worker as needed via the image processing performed. The system 100 may simultaneously but separately analyze each worker present for authorization to be in the safety zone 124 and whether each worker is properly protected with PPE items. One or more feedback devices 114 can be activated to notify all of the workers present that there is unauthorized worker or that proper PPE items have not been detected and presumably are not present. As shown in the example of FIG. 3, the worker 152 is facing toward the camera 102*a* and away from the camera 102*b*, and as such the system may perform simultaneous image analysis on both the front and rear sides of the worker 152 to detect different object targets that may be visible to one of the cameras but not the other. The image processing may proceed while the worker 152 is moving in, within, and out of the safety zone 124.

In contemplated embodiments one or more feedback devices 114 can be activated differently to provide different notifications of workers to distinguish a detection of an unauthorized worker and a detection of an unprotected worker via failure to detect PPE item(s). For example, different audible sounds or messages can be provided, different visual cues can be presented, and different types of tactile feedback can be produced from haptic feedback elements allowing workers to distinguish different detection events. When haptic feedback elements are present in wearable items of the worker, tactile feedback (e.g., vibration) can be directed specifically to the offending unauthorized worker or unprotected worker if the worker is uniquely identified in the image processing via, for example, facial recognition techniques or other unique attributes of a worker identification element.

The system 100 can beneficially anticipate worker authorization concerns and PPE item concerns before a worker actually enters a safety zone based on directional movement of the worker which may be determined from the image-based analysis. For example, when a worker is outside of any safety zone but is moving toward one, the system can detect the worker and PPE items needed for the safety zone that is being approached. As another example, wherein a worker is inside one safety zone (e.g., a first safety zone) and is moving toward another (e.g., a second safety zone), the system 100 can again detect the worker's proximity and PPE items needed for the second safety zone that is being approached. The system 100 can therefore be proactive in nature and operate to determine image-based worker authorization and adequate PPE item protection in advance of the worker actually entering the safety zone of interest. This means that beneficial advance warning to the worker is possible before the worker actually enters the safety zone and before exposure to the hazard occurs.

While one electrical panel 150 is shown in FIG. 3, industrial power systems typically include a number of different electrical panels 150 in different locations, sometimes having different ratings to meet different power requirements at their point of installation to feed electrical power to different electrical loads in the workplace. As such, safety zones and virtual boundaries may vary amongst different electrical panels 150. The system 100 is generally scalable to monitor any number of electrical panels 150 for worker safety monitoring in the manner described above. Also, similar arc flash concerns and shock issues for electrical power systems are not necessarily limited to electrical panel locations, so safety zones may apply to electrical hazard locations that do not include an electrical panel.

Figure 4:
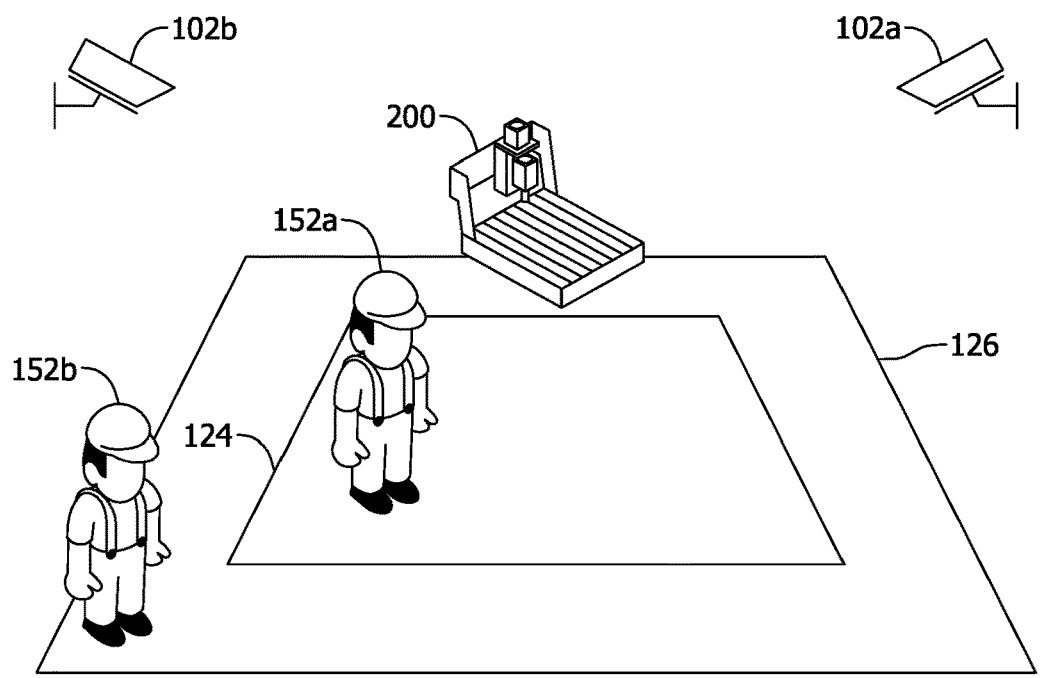
FIG. 4 illustrates the video analytic worker safety monitoring system as applied to a second exemplary workplace hazard.

FIG. 4 illustrates the video analytic worker safety monitoring system 100 operating to monitor worker safety in relation to a second exemplary workplace hazard in the form of an industrial machine 200. Safety zones 124, 126 may be established proximate the machine 200 and virtual boundaries may be established corresponding to the safety zones 124, 126. Hazards related to the safety zones may relate to, for example only, clearance zones needed to avoid contact with moving machine elements, exposure to energy outputs by the machine, machine byproducts (e.g., debris or vapors), exposure to chemicals and substances utilized in processes performed by the machine, heat, light emissions, pressure effects, extreme vibration, loud noise, etc. as industrial processes are performed that may raise safety or health concerns to a worker present in each safety zone, and that in turn may raise different PPE item requirements for the workers in each safety zone 124, 126. Because the industrial machine 200 presents different hazards than the electrical panel 150 (FIG. 3) different types or grades of PPE items are typically needed for the industrial machine than for the electrical panel. As such different types or grades of PPE items for purposes of the industrial machine are well-known, further description thereof is omitted herein.

In the example shown in FIG. 4, two workers 152*a*, 154*b* are shown that may be simultaneously analyzed by the image processor in a similar manner to that described above by detecting object targets that can be used to assess worker authorization and proper use of PPE items in the respective safety zones. Feedback devices 114 can be activated to notify all of the workers present that there is unauthorized worker or that proper PPE items have not been detected and presumably are not present. The image processing may proceed while the workers 152*a*, 152*b* is moving in, within, and out of the safety zone 124.

While one industrial machine 200 is shown in FIG. 4, industrial power systems typically include a number of industrial machines 200 of the same or different type in the same general location or in different locations in a workplace. As such, safety zones and virtual boundaries may vary amongst different industrial machines 200. The system 100 is generally scalable to monitor any number of industrial machines 200 for worker safety monitoring in the manner described above.

Combinations of industrial machine 200 and electrical panels 150 in many contemplated installations may reside in different areas of the same workplace and may be attended to by the same or different workers. The system 100 can monitor worker safety for the hazards of industrial machines 200 and monitor worker safety for the hazards of electrical panels 150. The system 100 is scalable to accommodate any number of industrial machines 200 and electrical panels 150 in an industrial workplace.

Figure 5:
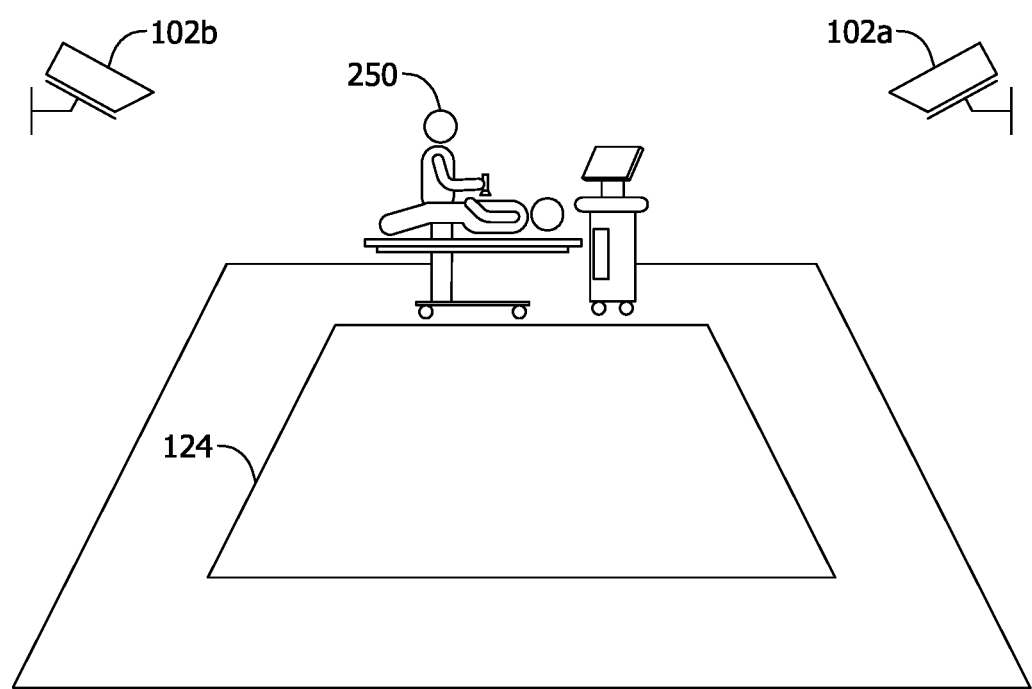
FIG. 5 illustrates the workplace safety video analytic sensor system shown video analytic worker safety monitoring system as applied to a third exemplary workplace hazard.

FIG. 5 illustrates the video analytic worker safety monitoring system 100 operating to monitor worker safety in relation to a third exemplary workplace hazard in the performance of a medical procedure being performed by a medical worker 250 such as a doctor in a safety zone 124. The safety zone 124 may vary depending on the procedure being performed and/or the condition of the patient in a known manner, and corresponding virtual boundaries may be established for use by the image processor 104. The safety zone 124 in the medicinal context may relate to medical worker exposure to communicable sickness or disease, exposure to bodily fluids of the patient, safety clearances needed for any tools or medical devices needed to perform the procedure, etc. The medical worker 250 and any other medical worker or assistant can be detected and analyzed by the image processor 104 based on detection of image targets to identify the workers, determine whether or not they are authorized to be present in the safety zone, assess a presence of required PPE items needed to protect the workers in the safety zone, and activate feedback devices to notify workers of unauthorized persons and/or unprotected persons in the safety zone. In this example, medical-grade PPE items would typically be of a different type than the PPE items described above for the electrical panel and industrial machine hazards. As such medical-grade PPE items are well-known, further description thereof is omitted herein.

The system 100 is scalable to accommodate any number of medical procedures presenting similar or different hazards while being performed in different locations in a medical treatment facility workplace.

While various different types of exemplary hazards and considerations relating to the exemplary hazards are discussed above, they are illustrative rather than limiting examples. The video analytic worker safety monitoring system 100 is generally applicable to any workplace hazard that poses worker-safety concerns. Safety zones may accordingly be defined for reasons apart from those described above that are effectively monitored by the system.

Figure 6:
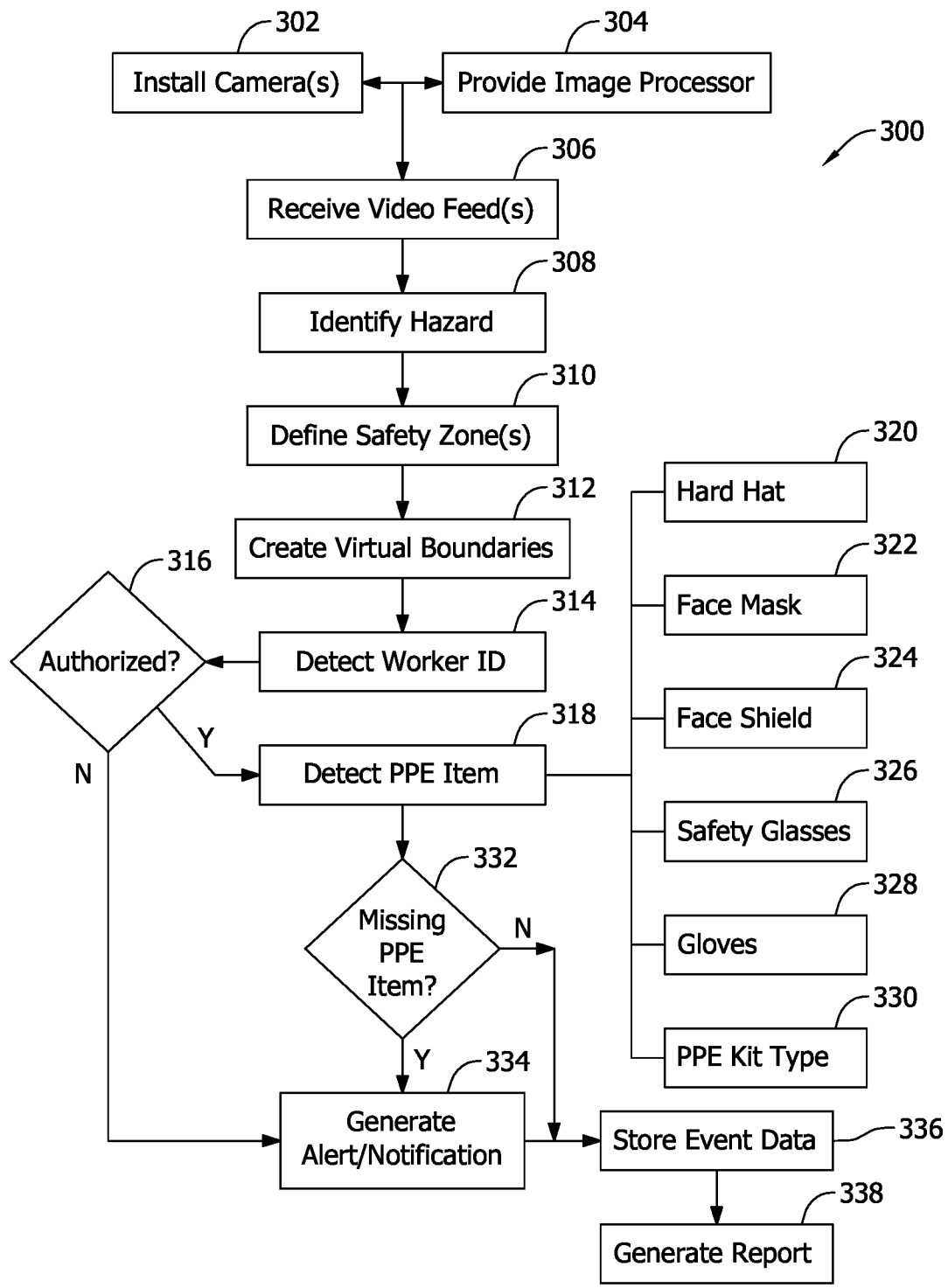
FIG. 6 is a method flowchart illustrating processes performed by the computer-implemented video analytic worker safety monitoring system.

FIG. 6 is a method flowchart illustrating processes 300 performed by the video analytic worker safety monitoring system 100. The processes 300 include preliminary steps of installing video cameras if cameras are not already in place, and providing and connecting the image processor to the cameras as shown at steps 302 and 304. The video cameras are then operable to provide streaming video feeds that are received by the image processor as shown at step 306. The processes 300 presumes that the image processor is further in communication with a database or other memory device including the data and information needed to accomplish the functionality describe above and below.

At step 308, the hazard being monitored for worker safety purposes is identified. Identification of the hazard may be made automatically be the system based on detection of image or object targets in the images analyzed for the hazard itself, in view of a label or other hazard identifier that can be detected in the images being analyzed, or in another manner. Hazard information and data may be located in the system database for use by the system in identifying hazards, and the database may also include additional data and information (e.g., location data and other data pertinent for other functionality and reporting by the system) for an identified hazard. In some embodiments, automated identification of the hazard by the system may be considered optional and may not be performed. Identification of the hazard may instead be made manually in the setup of the system.

At step 310, one or more safety zones are defined for the identified hazard from step 308. The safety zones may be defined automatically by the system as described above per the applicable calculations and considerations for the hazard (s) being monitored, by retrieving the applicable zones from safety zone data and information stored in the database, or may be manually defined in the setup of the system.

At step 312, virtual boundaries are created and established by the system for purposes of image processing of the system. The virtual boundaries in contemplated embodiments generally correspond to the size and shape of the safety zones defined in step 310.

At step 314, image analysis is performed on the received video feeds from step 306 and a worker's proximity to the virtual boundary is detected based on identification of an image/object target as described above. Detection of the worker at step 314 may include unique identification of a specific worker in some embodiments, or a mere detection of a worker without uniquely identifying the worker. Worker identification data and information may be stored in the system database in order to make worker detections and identifications.

At step 316 the system determines, based on the proximity detection of the worker at step 314 whether or not the worker is authorized to be present in the safety zone established at step 310 in reference to the virtual boundaries established at step 312 and data and information in the database concerning monitored workers. In contemplated embodiments, authorization of the worker at step 316 is based on the detected presence of the worker ID at step 314. If the worker ID is detected (i.e., the worker is recognized) the detected worker is deemed authorized by the system. If the worker ID is not detected the detected worker is not deemed authorized by the system.

When the detected worker is deemed authorized at step 316, at step 318 the images are further analyzed from the video received at step 306 to detect image/object targets associated with PPE items needed to protect the worker in the detected location. The image processor looks for image and object targets associated with PPE items, such as those shown only by example to include a hard hat detection at step 320, a face mask detection at step 322, a face shield detection at step 324, safety glasses or goggles detection at step 326, and glove detection at step 328 based on image comparison data stored in the database to identify the PPE items. One or all of the PPE items may be detected at steps 320 through 330 in different embodiments, and as shown at step 330 a PPE kit type may also be detected via a label or other visual indicator for the type or grade of PPE items needed for the hazardous location. The PPE item detections shown in FIG. 6 are exemplary only, and in further or alternative embodiments detections may be made of different combinations of PPE items appropriate to the hazard being monitored. PPE data and information stored in the system database can be accessed for image and object targeting and identification of a wide variety of different types of PPE items.

At step 332 the system determines whether required PPE items are missing or are of the wrong type for the hazardous location being monitored. The determination at step 332 may be made in reference to a PPE item lookup table stored in the database for the hazard being monitored. Detected PPE items are compared to the items listed in the lookup table, which may include the PPE kit type.

If PPE items are determined to be missing at step 332 or are determined to be of the wrong kit type, the system at step 334 generates alerts and notifications to inadequately protected workers and supervisors via feedback devices 114 and employer devices 112. Alerts and notifications may be generated in any manner described above or below. Appropriate measures may be taken by inadequately protected workers such as leaving the hazardous location or obtaining the proper PPE items, and supervisors may also take appropriate action to investigate detected worker safety actions and take appropriate measures in response to achieve worker safety objectives.

If workers are determined to be not authorized at the detected location at step 316, the system likewise generates alerts and notifications at step 334 so that inadequately protected workers and supervisors may take appropriate actions.

At step 336 detected event data is stored in the system database. Detected event information may include unauthorized worker detection events, authorized worker detection events, missing or inadequate PPE item detection event, and confirmed PPE item detection events. Event data stored by the system may include date and time data for each detected event, location data for each detected event, worker identification data for each detected event, authorized or unauthorized worker status data, PPE item detection data, PPE missing item data, PPE kit type data, and supporting images for detections made.

At step 338, reports may be generated including stored data for detailed analysis of system performance, optimization and troubleshooting of the system, and to assess worker compliance with safety protocols concerning monitored workplace hazards and proper usage of PPE items.

Image processing analysis for the detections and determinations described above may employ Python and Deep machine learning algorithms upon streamed video images. Known object detection techniques such as regions with convolutional neural networks (R-CNN), Fast R-CNN, Faster R-CNN and you only look once (YOLO) objection detection may be utilized by the system to perform image processing in contemplated embodiments. As such algorithms and detection techniques are known and familiar to those well versed in machine vision such algorithms and techniques are within the purview of those in the art and are not further described herein.

Figure 7:
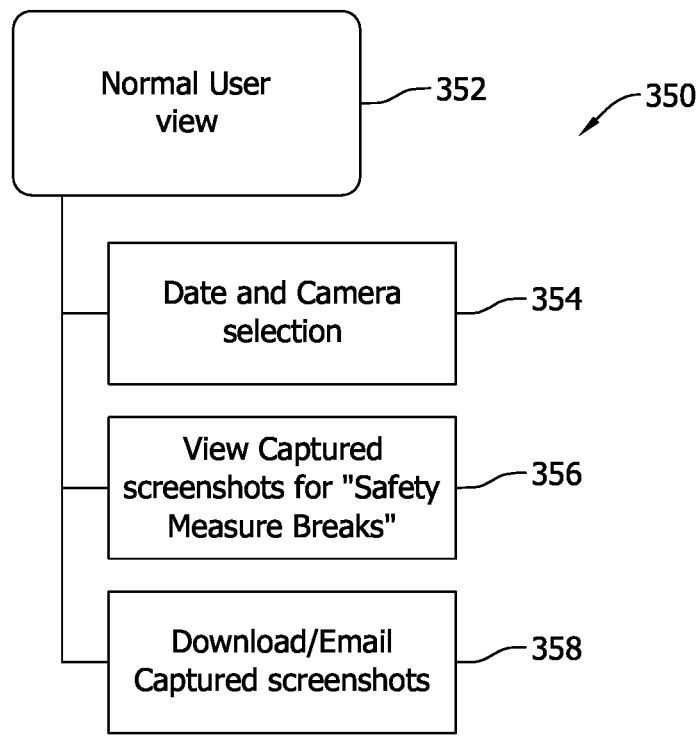
FIG. 7 illustrates exemplary employer user interface processes performed by the video analytic worker safety monitoring system.

FIG. 7 illustrates exemplary employer user interface processes 350 performed by the video analytic worker safety monitoring system 100. Processes 350 represents the functionality of the user interface for employees or supervisors accessing the system via one of the employer devices 112 (FIG. 1). The user interface may be generated by hosted web service 110 or may run on the employer device itself via an app that interfaces with the web service 110. In a contemplated embodiment, the user interface may be implemented using Angular Framework, a well-known app development tool.

The user interface displays as shown at step 352 a normal view that in contemplated embodiments is a graphical screen display allowing the supervisor or employer to monitor real-time operation of the system 100 at particular points of interest or pertinent user-selected history of the system operation. Accordingly, the normal view includes options allowing the user to select a particular video camera and enter time and date criteria as shown at step 354. At step 356 the user can see images in the form of captured screen shots received from the selected camera at the specified time and date from step 354. The user can therefore visually observe what the cameras captured and see, for example, the capture image of the unauthorized worker or the unprotected worker. At step 358 the user can download or request delivery of the capture screenshots in a selected manner (e.g., via email) for the user's further review or to communicate with colleagues and subordinate workers regarding captured worker safety events. The processes of the normal view allow a supervisor to quickly and easily understand the nature of the detected events via the captured images rather than reading data-driven reports without images, although the camera selection and time and date selection entered at step 354 may be prompted by an incident report sent to the user who may not have been logged into the interface at the time of the events of interest.

Figure 8:
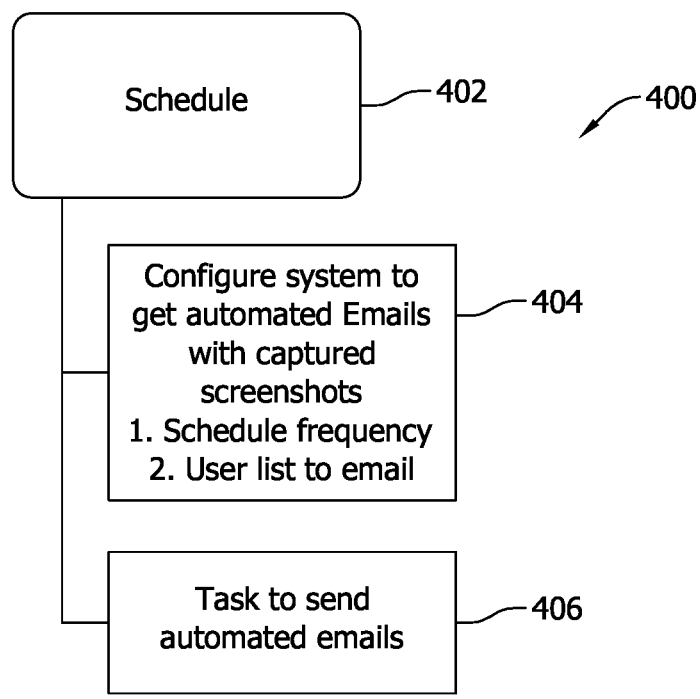
FIG. 8 illustrates exemplary scheduling processes performed by the video analytic worker safety monitoring system.

FIG. 8 illustrates exemplary scheduling processes 400 performed by the video analytic worker safety monitoring system 100. Processes 400 represent the functionality of the user interface for employees or supervisors accessing the system via one of the employer devices 112 (FIG. 1).

The user interface displays as shown at step 402 a schedule view that in contemplated embodiments is a graphical screen display allowing the supervisor or employer to schedule automated reports from the system 100. Via the schedule view, the user is able at step 404 to configure the system to send email reports with captured screen shots for detected worker safety deficiencies (i.e., unauthorized worker detections or insufficiently protected workers as described above). The configuration at step 404 includes a selection of a desired schedule frequency and a user list for email reports generated. For example reports may be scheduled to generate automated emails on a daily basis, a weekly basis, etc. at a selected time. With such configurations, users need to log on to the system in order to retrieve and view captured screen shots. Instead, email reports with screenshot images will be conveniently received and reviewed on a period basis corresponding with the accepted scheduling options and user preferences.

At step 406, the user may task the system 100 to automatically send reports via email with supporting images for selected event types in real time instead of the selected frequency of step 404. As such, and for example, the user may have a greater interest in detected worker safety deficiencies for a subset of the hazards being monitored and would prefer to receive real-time reports without delay when such events are detected. For example, and in the electrical panel hazard scenario in the example of FIG. 3, the highest rated panels presenting the greatest hazard may be selected at step 406 for real-time report generation of detected worker safety deficiencies, while detected worker safety deficiencies for lower rated panels may be reported at the periodic frequency selected at step 404. The user may therefore prioritize reporting of detect events relating to selected hazards at step 404.

Figure 9:
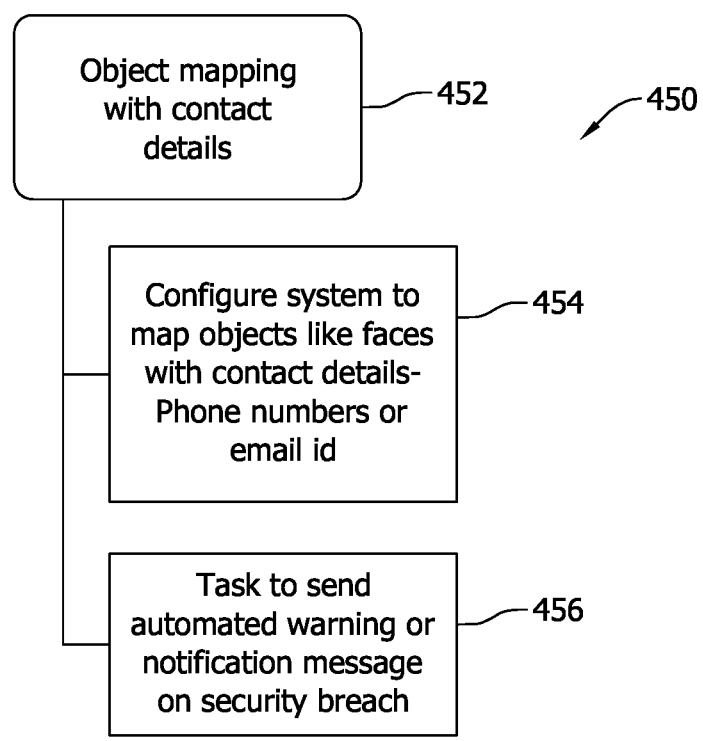
FIG. 9 illustrates exemplary notification processes performed by the video analytic worker safety monitoring system.

FIG. 9 illustrates exemplary notification processes 450 performed by the video analytic worker safety monitoring system 100. Processes 450 represent the functionality of the user interface for employees or supervisors accessing the system via one of the employer devices 112 (FIG. 1).

As shown at step 452 an object mapping with contact details view is displayed that in contemplated embodiments is a graphical screen display allowing the supervisor or employer to select notification options. At step 454, the user may configure the system to map objects to specific persons who may be contacted in response to detected worker safety deficiencies. For instance, in a system implementation including facial recognition capability the user can input contact information (e.g., cell phone number or email) for the respective faces that are identified by the system. As such, the system can directly and automatically contact an affected worker via phone or email with a report or instruction concerning a detected worker safety deficiency involving the affected worker. Similar features can be enabled if a worker is identified via a unique ID badge or other objects that can be correlated with a unique worker identity for the contact purposes of step 454.

At step 456 the user may task the system to send automated warning or notification message concerning a nondetected worker safety deficiency event. For example, if a worker identification element or a person's face is detected that is not recognized by the system (i.e., cannot be mapped to an actual worker or to a valid worker identification element issued by the employer) the system can send warning or notification messages to specific persons of a presumed security breach.

The processes shown in FIGS. 7-9 can be implemented in graphical screen displays including menu driven selection features, drop-down lists, fillable fields by the user, buttons and other user-friendly interface features for the user to intuitively set system preferences in the aspects concerned.

The technical effect of the processes and systems described herein is achieved when data and information such as that described above is entered, transmitted, downloaded or otherwise accepted by the video analytic worker safety monitoring system 100 or otherwise made available to the video analytic worker safety monitoring system 100 via the database or databases described in order to realize the functionality described.

The above-described embodiments of the disclosure may be implemented using computer programming or engineering techniques including computer software, firmware, hardware or any combination or subset thereof, wherein the technical effects described above are achieved. Any such resulting program, having computer-readable code means, may be embodied or provided within one or more computer-readable media, thereby making a computer program product, (i.e., an article of manufacture), according to the embodiments described above. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

Such computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

The applications described above are flexible and designed to run in various different environments without compromising any major functionality. In some embodiments, the system includes multiple components distributed among a plurality of computing devices. One or more components are in the form of computer-executable instructions embodied in a computer-readable medium. The systems and processes are not limited to the specific embodiments described herein. In addition, components of each system and each process can be practiced independently and separately from other components and processes described. Each component and process can also be used in combination with other assembly packages and processes.

One or more computer-readable storage media may include computer-executable instructions embodied thereon for the computer devices described. For example, each image processor computer device described may include a memory device and a processor in communication with the memory device, and when executed by the processor in each respective device the computer-executable instructions may cause the processor to perform one or more algorithmic steps of a method such as the method described and illustrated in the example of FIG. 6. Additional computer devices described (e.g., the employer device and worker device) may include a memory device and a processor in communication with the memory device, and when executed by the processor in each respective device the computer-executable instructions may cause the processor to perform one or more algorithmic steps in interfacing with the components of the video analytic worker safety monitoring system 100 to access or receive detected event information and images.

Having described devices and applicable operating algorithms functionally per the description above, those in the art may accordingly implement the algorithms via programming of the processor-based computing devices. Such programming or implementation of the concepts described is believed to be within the purview of those in the art and will not be described further.

The benefits and advantages of the inventive the video analytic worker safety monitoring system are now believed to have been amply illustrated in relation to the exemplary embodiments disclosed.

An embodiment of a video analytic worker safety monitoring system has been disclosed including at least one video camera having a field of view including at least one defined safety zone in a workplace, the at least one defined safety zone including or being proximate to a workplace hazard. An image processor receives a video feed from the at least one video camera, wherein the image processor is configured to: based on image analysis of the received video feed, detect a worker proximity in relation to the defined safety zone; and determine whether the detected worker is authorized to complete a task in the safety zone.

Optionally, the image processor may be configured to detect the worker proximity in relation to a virtual boundary corresponding to the safety zone. The at least one safety zone and the virtual boundary may be automatically determined by the image processor. The image processor may be configured to determine whether the worker is authorized by identifying an object in the received video feed. The object may be a worker lanyard, a worker identification badge, or a worker's face. The system may also include a database, with the image processor being configured to compare the identified object to information stored in the database to determine whether the worker is authorized.

As further options, the image processor may also be further configured to: based on image analysis of the received video feed, detect at least one item of personal protective equipment for a worker present in the at least one safety zone; and determine whether the at least one detected item of personal protective equipment adequately protects the worker present in the at least one safety zone. The image processor may determine whether the at least one detected item of personal protective equipment adequately protects the worker present in the safety zone by comparing the at least one detected item of personal protective equipment to personal protective equipment data stored in a database. The at least one item of personal protective equipment may be selected from the group of a hard hat, a face mask, a face shield, safety glasses, and gloves.

The image processor may also be configured to: based on image analysis of the received video feed, detect a personal protective equipment type for a worker present in the safety zone; and determine whether the detected personal protective equipment type adequately protects the worker present in the safety zone.

The at least one video camera may be a closed circuit television (CCTV) camera. The at least one video camera may also include at least two video cameras. The at least one defined safety zone may include first and second safety zones.

The workplace hazard may be an electrical panel, an industrial machine, or may relate to a medical procedure.

The system may additionally include at least one feedback device activated by the image processor in relation to a worker safety deficiency event.

The system may also include an employer computing device, wherein images of worker safety deficiency events are accessible through the employer computing device.

The system may automatically generate notifications of worker safety deficiency events to at least one supervisor or at least one worker. Generated notifications may include at least one image of a worker safety deficiency event.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A video analytic worker safety monitoring system comprising:
    at least one video camera having a field of view including at least one safety zone in a workplace, wherein the at least one safety zone is associated with an electrical equipment and a workplace hazard, wherein the at least one safety zone is defined by an electrical rating of the electrical equipment, wherein the electrical rating corresponds to an electrical power requirement associated with the electrical equipment;
    one or more processors configured to receive a video feed from the at least one video camera, wherein the one or more processors are configured to:
        determine the electrical rating of the electrical equipment based on one or more machine-readable parameters associated with the electrical equipment detected by image analysis of the video feed;
        determine, using the electrical rating of the electrical equipment, a boundary of the at least one safety zone from a database;
        based on the image analysis of the video feed, detect a worker within the boundary of the at least one safety zone; and
        determine, based in part on the electrical rating of the electrical equipment, whether the detected worker is authorized to be in the at least one safety zone.

2. The system of claim 1, wherein the one or more processors are configured to detect the worker within the boundary of at least one safety zone based on the boundary of the at least one the safety zone.

3. The system of claim 2, wherein the at least one safety zone and the boundary are automatically determined by the one or more processors.

4. The system of claim 1, wherein the one or more processors are configured to determine whether the worker is authorized by identifying an object in the received video feed.

5. The system of claim 4, wherein the object is a worker lanyard or a worker identification badge.

6. The system of claim 4, further comprising the database, the one or more processors being configured to compare the identified object to information stored in the database to determine whether the worker is authorized.

7. The system of claim 1, wherein the one or more processors are configured to determine whether the worker is authorized based on facial recognition.

8. The system of claim 1, wherein the one or more processors are further configured to:
    based on image analysis of the received video feed, detect at least one item of personal protective equipment for a worker present in the at least one safety zone; and
    compare the at least one detected item of personal protective equipment with a list of personal protective equipment items required for the at least one safety zone.

9. The system of claim 8, wherein the list of personal protective equipment items required for the at least one safety zone is retrieved from the database.

10. The system of claim 8, wherein the at least one item of personal protective equipment is selected from a list of a hard hat, a face mask, a face shield, safety glasses, and gloves.

11. The system of claim 1, wherein the one or more processors are further configured to:
   based on image analysis of the received video feed, detect a personal protective equipment type for a worker present in the safety zone; and
   compare the detected personal protective equipment type with a type of personal protective equipment items required for the safety zone.

12. The system of claim 1, wherein the at least one video camera comprises at least two video cameras.

13. The system of claim 1, wherein the at least one video camera is a closed circuit television (CCTV) camera.

14. The system of claim 1, wherein the at least one safety zone comprises first and second safety zones.

15. The system of claim 1, wherein the workplace hazard is associated with an electrical panel.

16. The system of claim 1, wherein the workplace hazard is associated with an industrial machine.

17. The system of claim 1, wherein the workplace hazard relates to a medical procedure.

18. The system of claim 1, further comprising at least one feedback device activated by the one or more processors in relation to a worker safety deficiency event.

19. The system of claim 1, further comprising an employer computing device, wherein images of worker safety deficiency events are accessible through the employer computing device.

20. The system of claim 1, wherein the system automatically generates notifications of worker safety deficiency events to at least one supervisor or at least one worker, the generated notifications including at least one image of a worker safety deficiency event.

* * * * *